May 16, 1950   F. A. DEXTER   2,508,015
SEPARATOR BLOWOFF VALVE
Filed Sept. 12, 1946

INVENTOR
*Frederick A. Dexter*
BY
ATTORNEY

Patented May 16, 1950

2,508,015

UNITED STATES PATENT OFFICE 2,508,015

SEPARATOR BLOWOFF VALVE

Frederick A. Dexter, Orange, Mass., assignor to The Leavitt Machine Company, Orange, Mass., a corporation of Massachusetts Application September 12, 1946, Serial No. 696,434

3 Claims. (Cl. 210—166)

This invention relates to blow-off valves, and more particularly to blow-off valves used as an adjunct to separators provided in compressed air systems for the purpose of removing moisture, oil and dirt from the system.

One of the objects of the invention is to provide a blow-off valve implemented with a compression spring and designed to be held against its seat by the compressed air of the system at normal working pressures. The valve, its said spring and associated parts are so designed and proportioned that when the system drops below a predetermined pressure, termed the "blow-off" pressure, the spring will lift the valve off its seat and present the relatively large opening of the valve through which the accumulated moisture, oil and dirt will be blown (by the pressure in the system) to the atmosphere. The improved blow-off valve is provided with a member which projects outside the valve and by which the valve may be manually raised off its seat when it is desired to cause a blow-off at any time and irrespective of the system pressure and at pressures above those which effect an automatic blow-off. The improved blow-off valve is further provided with a relatively small passage leading to atmosphere presenting a "constant vent" for the accumulated moisture and oil which are thus continuously being eliminated from the system. The aforementioned provision for automatic blow-off and for manual blow-off functions to rid the valve of moisture, oil and dirt which may have accumulated therein despite the aforesaid constant vent and to flush out the valve including the constant vent passages.

A further object of the invention is to provide a blow-off of the character described which will be comprised of a small number of parts which are of simple construction and economical to manufacture.

A still further object of the invention is to provide a blow-off valve of the character described which will be reliable in operation and will effectively rid the system of accumulated moisture, oil and dirt both during the constant venting and its periodic blow-off.

A further object is to provide a blow-off valve having a minimum of communicating internal passages of simple construction which present a wide clearance space for the moisture, oil and dirt, with no obstructions and restrictions to their easy flow through the valve.

Figure 1:
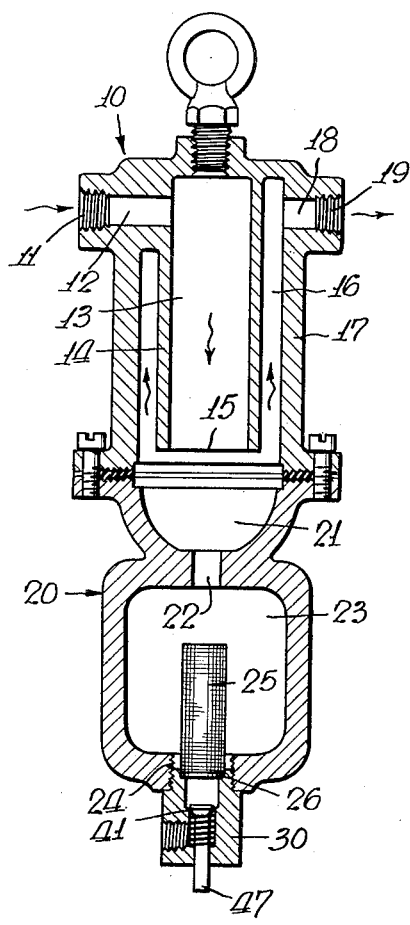
Figure 2:
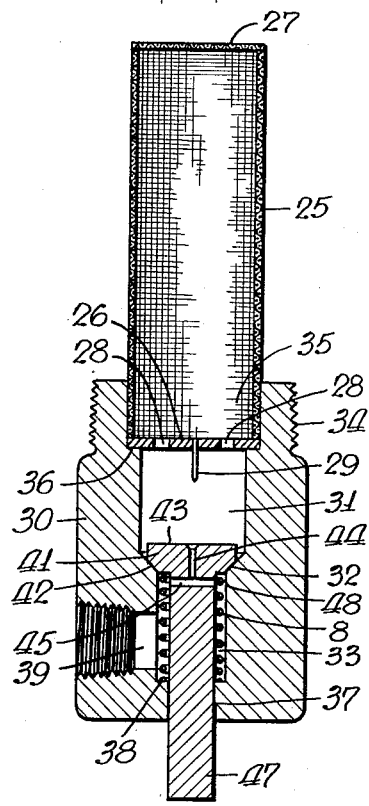

For the attainment of the foregoing and such other objects as may appear or be pointed out, I have shown an embodiment of my invention in the accompanying drawing, wherein:

Fig. 1 is a sectional elevation of a separator showing the application of the improved blow-off valve; and Fig. 2 is a sectional elevation of the improved blow-off valve, on enlarged scale.

The improved blow-off valve is shown in operative relation to a particular type of separator which is placed in a compressed air system for the purpose of separating moisture, oil and dirt from the compressed air in the system; the function of the blow-off valve being to eliminate the moisture, oil and dirt accumulated in the separator and to discharge the same to atmosphere. It will be understood, however, that the improved blow-off valve may be used with other types of separators, that it may be used for any kind of fluid system, steam, gas, as well as compressed air, and that the improved blow-off valve may be applied to the piping, valves, fittings, chambers and other parts of the fluid system and is not limited in its use as an adjunct to separators.

Separator 10 is connected, at inlet 11 and outlet 19, in the compressed air system, the compressed air passing through inlet passage 12 into a large central space 13 within a shell 14 which is closed at the top except for the said inlet 12 and which has an open mouth 15 at its bottom end. The compressed air expands upon entering large space 13 of the shell 14 and moves downwardly and through open mouth 15 of the shell and then upwardly through the annular space 16 between shell 14 and cylindrical casing 17 of the separator, and back into the main line of the compression system through the outlet passage 18. At the lower end of cylindrical casing 17 is secured in any preferred or desired manner as by bolts and suitable gaskets, as shown, a casing 20 which has an upper percipitation space 21 and a separation chamber 23, the two being in communication through opening 22. As the downwardly moving air leaves mouth 15 of shell 14 and abruptly changes its direction of flow from downward to upward as it enters the annular space 16, the moisture, oil and dirt suspended in the expanded and rapidly moving air, is precipitated out because of the abrupt change of direction, the heavier particles of moisture, oil and dirt continuing, by reason of inertia, downwardly into precipitation space 21. The moisture, oil and dirt thus precipitated out of the air stream gravitates, and is forced by the pressure of the system, through passage 22 into separation chamber 23. Valve block 30 has a large central cavity 31 opening at the top of the block in a mouth 35 which is of somewhat larger diameter than the diameter of cavity 31 to provide an annular shoulder 36. Within the enlarged mouth 35 is press fitted a cylindrical strainer which is fabricated of wire mesh to form a cylindrical wall 25 and a closed upper end 27; the lower end of wire mesh strainer 25 is left open. This open end or bottom of the strainer rests on a disc 26 of any preferred or desired material such as metal which seats on annular shoulder 36 of valve block 30 and which is likewise press fitted in mouth 35.

Central cavity 31 of valve block 30 terminates at its lower end in an annular, tapered surface 32 which is concentric to a central, cylindrical bore 33 of reduced diameter which extends from central cavity 31 to and through the lower end of the valve block. Near its lower opening, bore 33 has a reduced portion 37 which provides an annular shoulder 38. Within the central cavity 31 is a valve 41 having an annular tapered surface 42 which engages similar tapered seat 32 of the valve block. Valve 41 is formed integrally with a stem 47 which is slidable in reduced portion 37 of the central bore, the end of the stem extending beyond valve block 30. Within the annular space between valve stem 47 and central bore 33 is a coil compression spring 8, the lower end of which seats on annular shoulder 38 of the central bore. Between the annular tapered surface 42 of the valve 41 and its juncture to valve stem 47 is an annular shoulder 48 on which the upper end of spring 8 seats.

Opening into central bore 33 near the lower end of the valve block is an outlet 39 which is internally threaded to receive a nipple or fitting (not shown).

The disc 26 of strainer 25 has a plurality of holes 28 affording communication between the interior of the strainer and central cavity 31 of the valve block. Strainer 25, Fig. 1, prevents large particles of dirt from entering the blow-off valve. The compressed air of the system and moisture, oil and smaller dirt particles separated from the system and isolated in separation chamber 23, however, pass through strainer 25 and holes 28 of disc 26 and enter central cavity 31. Coil spring 8 and the flat surface 43 of valve 41 are so designed that at the normal working pressure of the system, the pressure of the compressed air within the central cavity 31 overcomes the upward compressive force of spring 8 and maintains annular surface 42 of the valve tight on valve seat 32. When the pressure of the system is lowered to or below the blow-off pressure, compression spring 8 overcomes the downward force exerted by the compressed air upon the flat surface 43 of the valve and causes the valve to be lifted off its seat. There is thus provided a wide annular passage between tapered surface 42 of the valve and valve seat 32, which passage opens into the annular space between valve stem 47 and central bore 33; as already described, the annular space is open to atmosphere throughout outlet 39.

The improved blow-off valve thus provides a wide passage directly from central cavity 31 to atmosphere. It should be noted that this passage is for the most part—i. e., at the annular space between valve surface 42 and its seat 32 and at the annular space between valve stem 47 and central bore 33—a continuation, in the longitudinal duration, of the central cavity 31, and that there is only a single change of direction, namely at the juncture of outlet 39 and the aforementioned annular space. Moreover, both annular spaces are defined by outer walls, namely, valve seat 32 and central bore 33, which are continuous, in the longitudinal direction, with the walls of central cavity 31. The moisture, dirt and oil accumulated in separation chamber 23, in strainer 25 and central cavity 31, are blown to atmosphere through the aforedescribed wide passage; and at the same time, the wide passage itself is cleared of moisture, dirt and oil by the blast of compressed air therethrough. This blow-off occurs automatically when, as described above, the system pressure falls below a predetermined pressure. The improved valve may be caused to blow off at any time, irrespective of the system pressure, by forcing valve stem 47 upwardly to raise its valve 41 off valve seat 32.

The improved blow-off valve has a constant vent to atmosphere through which the moisture, oil and dirt is constantly discharged to atmosphere, by the system pressure. This constant vent is so small that there is no appreciable drop in pressure and a negligible loss of compressed air. To provide this constant vent, valve stem 47 has a small channel or drill hole 45 near its juncture to valve 41 diametrically disposed and opening at both ends into the annular space between valve stem 47 and central bore 33. Centrally located in valve 41 is a small channel or drill hole 44 longitudinally extending from top surface 43 of the valve to the aforedescribed diametrical channel 45. Moisture, oil and dirt are thus constantly vented through channels 44 and 45 to the annular space of central bore 33 and through outlet 39 to atmosphere. Depending from disc 26, centrally located therein, is a pin 29 which enters the central vent channel 44 of valve 41 when the valve is raised during the blow-off, for the purpose of clearing the channel, which may have become clogged because of its relatively small diameter.

It will be observed that the blow-off valve herein disclosed is made of relatively few parts which can be quickly and readily assembled and disassembled for cleaning or replacement. The assembly operation requires merely placement successively of spring 8, valve 47, disc 26 and strainer 25. Disassembling requires merely a reversal of these assembly steps.

I claim:

1. A blow-off valve for a fluid system comprising a casing having an inlet and an outlet, a block secured to said casing and having means for securing it at a low point in said system and a central cavity opening at its upper end in an enlarged mouth to provide an annular shoulder, an apertured disc press fitted in said enlarged mouth and seated on said annular shoulder, a cylindrical strainer having an open end press fitted in said mouth with its open end abutting the said disc, said central cavity terminating at its lower end in an annular tapered surface, a central bore extending from the lower edge of the said annular tapered surface of the central cavity and having at its lower end a portion reduced to present an annular shoulder, a valve having a stem and an enlarged head, said stem being slidable in said reduced portion of the central bore with its end extending beyond the said block, said valve head having a flat upper surface and an annular tapered surface contacting the said annular tapered surface of the central cavity with the lower edges of the two tapered surfaces coextensive, the juncture of said stem and enlarged head presenting an annular shoulder equal in width to the said annular shoulder of the central bore, a coil spring received in the annular space between the said valve stem and central bore with its lower end seated on the annular shoulder of the central bore and with its upper end seated on the annular shoulder of the valve, an outlet at the lower end of said annular space leading to atmosphere, a diametrically disposed channel through the stem near its juncture to the valve head and opening into said annular space, and a central channel in the said valve head extending from its flat upper surface to the said diametrically disposed channel, the said disc having a centrally located pin depending therefrom and receivable in the said central channel of the valve head when the valve is raised.

2. A blow-off valve for a fluid system comprising a casing having an inlet and an outlet, a block secured to said casing and having a threaded neck for securement at a low point in said system and a central cavity opening at its upper end in an enlarged mouth to provide an annular shoulder, an apertured disc press fitted in said mouth and seated on said annular shoulder, a cylindrical strainer having an open end press fitted in said mouth with its open end abutting the said disc, said central cavity terminating at its lower end in an annular tapered surface, a central bore extending from the lower edge of the said annular tapered surface of the central cavity and having at its lower end a portion reduced to present an annular shoulder, a valve having a stem and an enlarged head, said stem being slidable in said reduced portion of the central bore with its end extending beyond the said block, said valve head having a flat upper surface and an annular tapered surface contacting the said annular tapered surface of the central cavity with the lower edges of the two tapered surfaces coextensive, the juncture of said stem and enlarged head presenting an annular shoulder equal in width to the said annular shoulder of the central bore, a coil spring received in the annular space between the said valve stem and central bore with its lower end seated on the annular shoulder of the central bore and with its upper end seated on the annular shoulder of the valve, said valve head being further provided with a central channel, an outlet at the lower end of said annular space leading to atmosphere, a constant vent affording communication between the atmosphere and said central channel in said valve head, the said disc having a centrally located pin depending therefrom and receivable in the said central channel of the valve head when the valve is raised.

3. A blow-off valve comprising a casing having an inlet and an outlet, a block secured to said casing and having an intercommunicating central cavity and central bore forming a valve seat at their juncture, the central cavity opening into an enlarged mouth to present an annular shoulder, an apertured disc in said annular shoulder, a cylindrical strainer in said enlarged mouth abutting said disc, a valve having a stem in said central bore and an enlarged head in said central cavity in closing engagement with said valve seat, a coil spring in the annular space between said valve stem and central bore, an outlet at the lower end of said annular space leading to atmosphere, a passage in said valve affording communication between the central cavity and said annular space, said passage including a central, vertical channel in said valve head, the said disc having a central depending pin enterable in said channel when the valve is raised.

FREDERICK A. DEXTER.

REFERENCES CITED

The following references are of record in the file of this patent:

UNITED STATES PATENTS

| Number | Name | Date |
| --- | --- | --- |
| 123,098 | Goodale | Jan. 30, 1872 |
| 569,943 | Shirely | Oct. 20, 1896 |
| 820,146 | Simonds | May 8, 1906 |
| 848,079 | Weiss | Mar. 26, 1907 |
| 920,716 | Beckman | May 4, 1909 |
| 934,286 | Cole | Sept. 14, 1909 |
| 1,091,463 | Vincent | Mar. 24, 1914 |
| 1,207,593 | Miller | Dec. 5, 1916 |
| 1,247,533 | Heath | Nov. 20, 1917 |
| 1,314,566 | Bogda | Sept. 2, 1919 |
| 1,764,181 | Raetz | June 17, 1930 |
| 1,847,964 | Hull | Mar. 1, 1932 |
| 1,959,314 | Wile | May 15, 1934 |
| 2,074,245 | Williamson | Mar. 16, 1937 |
| 2,165,649 | Parsons | July 11, 1939 |
| 2,376,124 | Coulbourn | May 15, 1945 |